Patented Sept. 16, 1952

2,610,918

UNITED STATES PATENT OFFICE 2,610,918

PREPARATION OF DRIED EGGS

Leo Kline and Thomas T. Sonoda, Berkeley, Calif., assignors to the United States of America as represented by the Secretary of Agriculture No Drawing. Application April 10, 1951,
Serial No. 220,329

13 Claims. (Cl. 99—210)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to the preparation of dried eggs and more particularly with the treatment of the eggs prior to drying in order to obtain dried products of exceptionally high quality. Briefly described, our invention envisions the fermentation of the egg liquid, prior to drying, with a particular type of yeast, namely, a non-invertogenic yeast. Fermentation with a yeast of this type makes it possible for us to obtain dried eggs which not only can be stored for extended periods of time without developing deleterious odors or flavors but which also exhibit the whipping (aeration) power of the natural product and retain this power over extended periods of storage. Further advantages and objects of this invention will be obvious from the description herein.

It is well known in the art that eggs can be preserved by drying. However, the product produced by simply spray-drying egg liquid is not satisfactory as it has very poor whipping properties and develops objectionable taste and odors after even short periods of storage. For this reason, various methods have been devised for pre-treating the eggs prior to drying, these treatments involving any one or a combination of fermentation, enzymic action, addition of chemicals, and so forth.

In the fermentation treatment the aim is to remove the glucose which is naturally present in the egg material since glucose has been shown to be an important cause of deterioration of dried eggs in storage, that is, development of bad taste and odor, loss of initial solubility, and loss of baking quality.

One fermentation method which is now in use involves maintaining the egg liquid at a temperature suitable for the growth of bacteria (around 35° C.) and allowing the adventitious flora (bacteria, yeasts, etc.) present in the egg material to multiply and consume the glucose. This method is slow particularly with egg white which is a poor medium for the micro-organisms. Further, in this lengthy fermentation, metabolic byproducts of disagreeable odors and flavors are produced by the growth of lipolytic and/or proteolytic flora naturally present in the egg material, this being particularly the case with yolk-containing mixtures such as whole egg. Because of these factors and the inconsistency of the type and rate of fermentation, the preparation of dried egg products by the natural flora fermentation method is not satisfactory. Another method which has been described involves addition of cultures of certain bacteria or baker's yeast to the egg liquid and allowing the bacteria or yeast to consume the glucose. Properly carried out, this method represents an improvement over the natural flora fermentation method in that the fermentation is much more rapid and the production of undesirable metabolic by-products is lessened. Further, the dried products are quite stable and can be stored for considerable periods of time without developing off-flavors or odors. However, such glucose-free egg dried by the customary spray drying process does not have any significant whipping (aeration) properties in that it will not form a foam when beaten at ordinary temperatures. Consequently the product is unsuitable for preparation of sponge goods containing no added leavening agent. However, the products can be used in preparing bakery goods, including prepared doughnut and cake mixes, which contain added leavening agent. It is to be noted that by removal of glucose the dried egg products will retain for extended periods of storage this latter type of baking quality which is not concerned with leavening action.

The problem of preparing dried eggs has been attacked from other aspects besides fermentation and it has been advocated that various chemicals be added to the egg liquid prior to drying. One technique involves addition to the egg liquid of sucrose, lactose, dextrins or other water-soluble saccharides. Sucrose is generally prefered and is added in a proportion of about 10% whereby the dried product contains about ⅓ sucrose and ⅔ egg solids. Such a product prepared by spray drying does exhibit the whipping (aeration) properties of the original liquid egg but has the disadvantage that it is highly unstable and upon storage will develop objectionable fishy odors and flavors even more rapidly than the dried egg products produced without any pre-treatment.

We have now found that the disadvantages of the prior art can be avoided by fermenting the liquid egg prior to drying with yeasts of a particular type, namely, non-invertogenic yeasts, a typical example being *Torulopsis monosa*. These organisms can be easily cultured on the usual biological media and the cells can be harvested by centrifugation or filtration. The entire culture can be added to the liquid egg for the fermentation but we prefer to add the separated cells to avoid contaminating the egg material with the constituents of the medium. These non-invertogenic yeasts have the ability to rapidly ferment the glucose in the egg material so that with *Torulopsis monosa*, for instance, the fermentation is complete in 30 minutes to 3 hours, depending on the type of egg liquid, the temperature, and concentration of added cells.

The main advantage of using a non-invertogenic yeast is that it makes possible production of a dried egg product which not only can be stored for extended periods of time without developing off-odors or flavors but which also exhibits good whipping (aeration) properties and retains these properties for extended periods of storage. For preparing such a product, a suitable proportion of sucrose is incorporated with the egg liquid after the fermentation but prior to drying.

It is to be emphasized that the particular yeasts which we use have the unique property that they do not elaborate the enzyme invertase and hence are incapable of inverting sucrose. Thus when the sucrose is incorporated with the fermented egg material, the sucrose remains as such in the product and is not assimilated, inverted or otherwise converted into reducing sugars. A satisfactory sucrose-containing dried egg product cannot be made with baker's yeast or other organisms recommended by the prior art for fermenting egg liquid. The point is that these organisms will assimilate the sucrose and thus remove it from the product, or will convert it by cell activity or enzymatic action into undesirable compounds, principally reducing sugars. Thus many of these prior art organisms, particularly baker's, brewer's, or wine yeast elaborate the enzyme invertase which will attack the sucrose and convert it into a mixture of glucose and fructose. Both of these are reducing sugars and will thus cause the dried product to rapidly develop off-odors and flavors. Thus if one were to ferment a batch of liquid egg with baker's yeast (*Saccharomyces serevisiae*) and then incorporate sucrose therein and dry it, the product would be very unstable. The invertase produced by the yeast would invert the sucrose thus forming glucose and fructose which would be available for reaction with the proteins and the phospholipids thereby giving rise to off-flavors and odors. In this connection, we performed the following experiment: A batch of whole egg was fermented with baker's yeast. To the fermented egg was added 10% sucrose and the mixture dried. The dried egg was analyzed and found to contain essentially equal proportions of sucrose and reducing sugars indicating that approximately half of the added sucrose had been inverted. A sample of this product, on standing developed objectionable odors and flavors even more rapidly than samples of unfermented dried egg. In contrast, when the liquid egg is fermented with a non-invertogenic yeast in accordance with this invention, this inversion does not take place. As set forth in more detail in the example, a sample of *T. monosa*-fermented sucrose-containing dried egg after 11 weeks' storage at 100° F. was found to contain only insignificant amounts of glucose.

The following example demonstrates the invention in greater detail. It is understood that this example is furnished only by way of illustration and not limitation.

EXAMPLE

A supply of fresh hen's eggs was obtained, the eggs were broken out and the yolks and whites homogenized to make a whole egg melange.

To 1000 grams of the melange was added 1.5 grams (dry weight basis) of young, active cells of *Torulopsis monosa*. The fermentation was conducted for 2 hours in a closed vessel under essentially anaerobic conditions at 30° C., the mixture being stirred slowly during the fermentation. At the end of this period, 100 grams of sucrose was added to the fermented mixture with agitation for 15 minutes. The resulting product was then frozen and dried under vacuum from the frozen state. The dried product had a moisture content of 2% and analysis (Somogyi method) showed that reducing sugars were not present.

The products were packed in sealed cans—170 grams per #2 can. Both air-pack and nitrogen-pack was used. Thus half the cans were sealed without altering the atmosphere in the cans, in the other half the cans were flushed with nitrogen and sealed under slight nitrogen pressure.

All the cans were then subjected to an accelerated storage period—i. e., storage at 100° F. for 11 weeks.

Control (unfermented) samples were prepared by mixing 100 grams of sucrose with 1000 grams of the whole egg melange then freezing this material and drying it under vacuum from the frozen state. This product had a moisture content of 2% and a reducing sugar content of 1.33% (egg solids basis).

Samples of the dried control products were canned using both air- and nitrogen-pack as with the previous fermented samples. These products were likewise stored 11 weeks at 100° F.

After the accelerated storage period, the various products were analyzed and subjected to quality tests. The results are summarized in the following table:

TABLE 1

| Sample | Product of this invention | Control (unfermented) | Product of this invention | Control (unfermented) |
|---|---|---|---|---|
| Type of pack | air | air | nitrogen | nitrogen |
| Proportion of glucose (egg solids basis), percent | 0.03 | 0.63 | 0.03 | 0.57 |
| pH after reconstitution | 8.6 | 8.3 | 8.7 | 8.4 |
| Fluorescence coefficient of ether extract | 0.7 | 1.4 | 0.6 | 2.8 |
| Fluorescence coefficient of salt sol. extract | 5.2 | 8.4 | 5.6 | 11.2 |
| Proportion of carbon dioxide in can, percent | 2.9 | 4.2 | 1.6 | 3.1 |
| Proportion of oxygen in can, percent | 17.0 | 11.0 | | |
| Sponge cake volume, ml | 676 | 688 | 683 | 664 |
| Custard palatability | 7.7 | 4.4 | 8.9 | 6.7 |

The tests referred to in the table and the facts they indicate are explained as follows:

The glucose analysis indicates that in the product of this invention the sucrose remains as such and is not inverted by the presence of the *Torulopsis monosa* cells. The decrease in glucose content in the control samples from 1.33% to 0.63% and 0.57%, respectively, indicates that the glucose naturally present has reacted with the protein and/or phospho-lipid constituents of the egg material, this being an indication of decomposition of the product.

In the pH tests, the samples were reconstituted with water to the concentration of natural whole egg. The control samples show a lower pH than the products of this invention. This indicates that in the control samples a Maillard-type of browning reaction has taken place involving reaction of glucose with amino containing constituents of the egg.

The fluorescence tests were made by extracting the egg powders with ether and then with aqueous salt solution, the fluorescence of the ether and salt solutions then being determined while irradiating these extracts with ultraviolet light of approximately 3600 Angstroms. The fluorescence measurements are reported in terms of the relative fluorescence coefficients based on the fluorescence of a standard solution of quinine. The ether extract fluorescence coefficient is an index of a decomposition mechanism involving reaction of glucose with cephalin (a phospholipid) whereas fluorescence of the salt solution extract is an index of a decomposition involving reaction of glucose and amino compounds. In both instances it is evident from the table that the control samples show a much greater degree of decomposition than do the products of this invention.

The gas analyses of the can atmospheres are an index of the degree of oxidative-type decompositions which take place during storage. This type of decomposition is evidenced by an increase in carbon dioxide and a decrease in oxygen. The figures show that these oxidative changes have taken place to a much greater extent in the control samples than in the products of this invention.

In the sponge cake tests, standard sponge cakes were made from each sample, the volume of each cake being measured. The figures indicate that all the products had good whipping (aeration) properties.

In the custard palatability tests, standard custards were made from each sample of dried egg. These custards were then submitted to a panel of ten persons skilled in the art of making organoleptic evaluations. The products were scored on the following basis: 10—no off-flavor; 8—slight off-flavor; 6—pronounced off-flavor; 4—very pronounced off-flavor; 2—extreme off-flavor; 0—inedible.

It is evident from the data that the products in accordance with this invention were rated as having only at most a slight off-flavor whereas the control samples had pronounced or very pronounced off-flavor.

In practice, our novel procedure is carried out as follows:

A supply of suitable liquid egg is first obtained. This may be prepared directly from good-quality fresh eggs or may be produced by thawing frozen eggs. The process can be applied to any type of egg liquid this term being understood to be inclusive of egg white, egg yolk or mixtures of the two.

The non-invertogenic yeast is then incorporated with the liquid egg and the fermentation carried out. As noted above, we prefer to add cells of the organism rather than a culture to avoid contaminating the egg with the other constituents of the medium. The amount of cells added may be varied depending on the time desired for completing the fermentation. Thus the greater the concentration of added cells the more rapid will be the fermentation. It is preferred to add sufficient cells to retain the characteristics of a resting-cell type of fermentation and to complete the fermentation before appreciable development of contaminating flora occurs. Thus with egg liquid containing yolk, the fermentation should be completed in 6 hours or less; with egg white the fermentation period may be considerably longer because the contaminating organisms grow extremely slowly in this medium. In general, to obtain the desired conditions of rapid fermentation under resting-cell conditions one may add, say, about 0.05 to about 2 grams (dry weight basis) of yeast cells for each 100 grams of egg liquid. In the case of T. monosa, it is preferred to add about 0.07 to 0.15 gram (dry weight basis) of active cells per 100 grams of egg liquid whereby a rapid removal of glucose is obtained. If the concentration of T. monosa cells is increased much above these preferred proportions, the fermentation will be much more rapid, but the product will tend to develop a noticeable "yeasty" flavor. The following table shows, merely by way of example, the effect of different concentrations of added cells.

TABLE 2

Removal of glucose from different egg materials by fermentation at 30° C.

| Amount of T. monosa cells (dry basis) per 100 ml. of liquid egg, grams | Time to complete fermentation (i. e., remove all the glucose) | | |
| --- | --- | --- | --- |
| | Whole egg (3.2 mg. glucose per ml.) | Egg white (3.85 mg. glucose per ml.) | Egg yolk (1.85 mg. glucose per ml.) |
| | minutes | minutes | minutes |
| 1.0 | 30 | | |
| 0.5 | 40 | 60 | |
| 0.25 | | 100 | |
| 0.15 | 80 | 135 | 60 |
| 0.07 | 150 | | 90 |

The fermentation is preferably conducted with the organism *Torulopsis monosa* which is also known by many other names as for example *Torula monosa*, *Candida monosa*, *Mycotorula monosa*, etc. This organism has no biological activity on sucrose, thus the organism does not assimilate sucrose and the organism does not elaborate any enzymes which attack sucrose. Further, *T. monosa* is particularly useful because it exhibits a rapid rate of fermentation, it does not impart any objectionable flavor to the product, it does not autolyze when the glucose is assimilated, it does not elaborate any pigment, it is easy to cultivate and it maintains its viability when kept in cool storage. In this connection, *T. monosa* keeps better than does baker's yeast.

Many other non-invertogenic yeasts may be used in place of *T. monosa*. These non-invertogenic yeasts may be divided, for the purposes of this invention, into two categories: (A) the yeasts such as *T. monosa* which have no biological activity on sucrose either by action of the cells per se or by action of the enzymes elaborated by the organism; (B) the yeasts which will assimilate sucrose but which do not elaborate invertase or in any other way produce reducing sugars from sucrose. The yeasts of category A have the advantage that the viable cells may be left in the egg product and they will not attack the added sucrose. On the other hand, when using the yeasts of category B, the cells must be destroyed as by pasteurization before the sucrose is added. Once the cells are rendered non-viable, the enzymes associated with the cells will not attack the sucrose. In category A one may use yeasts of the sporulating type as for example *Schizosac*-

*charomyces octosporus, Zygosaccharomyces soya*, etc. or those of the non-sporulating type as for example *Torulopsis pulcherrima, Torula molischiana, Kloeckera apiculata, Kloeckera africana*, many species of Hanseniaspora, and so forth. In category B one may use for example *Torula alactosa, Torula candida* Saito, and so forth. Selection of other suitable non-invertogenic yeasts by reference to the standard compendia on microorganisms will be obvious to those skilled in the art. The expression "non-invertogenic yeast" as used herein means a yeast which is incapable of producing reducing sugars from sucrose by means of invertase elaboration or other cell activities.

The fermentation may be carried out over a wide range of temperatures, usually temperatures from about 10° to about 40° C. give good results. With *T. monosa*, the rate of the reaction is greatest at a temperature of about 30° C. At lower temperatures the rate of the reaction decreases so that for example at 10° C. the rate is ⅕ to ¼ that at 30° C. At temperatures higher than 30° C., the rate of reaction decreases but not as rapidly as at the lower temperatures. In general, temperatures greater than about 30° C. are not preferred as they are conductive to the autolysis of the cells and may promote the growth of undesired organisms.

The fermentation is usually carried out at the natural pH of the egg liquid although in some cases it may be advantageous to lower the pH to about 5 or 6 by addition of an edible acid. Thus in the case of *T. monosa*, it has been observed that the fermentation is accelerated to the extent of about 25% to 35% at pH's below 6. Thus, for example, whereas a typical fermentation required 122 minutes for completion at an initial pH of 7.4, by adjusting the initial pH to 5.9 and 5.4, respectively, the time for complete fermentation was reduced to 83 minutes and 75 minutes, respectively. Thus to obtain a more rapid fermentation sufficient citric, tartaric, lactic, hydrochloric, phosphoric, or other edible acid may be added to the egg liquid to adjust its initial pH to about 5 to 6. However, in general we have found that the increase in fermentation rate does not justify the expense and additional work of pH adjustment so that we prefer to conduct the fermentation at the natural pH of the egg liquid.

The fermentation is preferably carried out under essentially anaerobic conditions whereby growth of the added organisms as well as adventitious flora is minimized. Since the yeast cells do not multiply to any substantial degree, the fermentation we obtain may be termed a resting-cell or non-proliferative fermentation. That is, the glucose is not assimilated by the organism to enable it to multiply but the intracellular enzymes associated with the yeast (primarily zymase) convert enzymatically the glucose into alcohol and carbon dioxide. The mechanism of our process involves diffusion of the glucose into the yeast cells whereupon the enzymes present therein catalyze the conversion of the glucose into alcohol and carbon dioxide. The mechanism is therefore essentially an enzyme-catalyzed chemical reaction which can be expressed by the equation:

$$C_6H_{12}O_6 \rightarrow 2C_2H_5OH + 2CO_2$$

Glucose   Alcohol   Carbon dioxide

It is evident from the above equation that the only products of the reaction are alcohol and carbon dioxide both of which are volatile and thus removed by vaporization in the subsequent treatment (drying) of the egg material. This chemical reaction occurs rapidly and is not tied down to cell growth as in the case of many prior art types of fermentation wherein removal of glucose requires actual cell multiplication to assimilate the glucose. Further, because of the rapidity of the fermentation and the anaerobic conditions the adventitious organisms have no time to multiply. This means that the development of off flavors and odors commonly associated with prior fermentation procedures are completely avoided. In general, the anaerobic conditions are obtained by carrying out the process in a vessel which is covered and filled to a large extent with the egg liquid. No special precautions need be taken to obtain absolute anaerobiosis because even if the top surface of the material is in contact with air, the major part of the material will be under anaerobic conditions.

In general, it is preferred to stir the mixture of egg liquid and yeast cells, particularly to disperse the yeast cells throughout the egg material. The agitation may be continued during the course of the fermentation but is not essential. If used, the degree of agitation should be just enough to keep the cells in suspension. Violent agitation is not necessary nor desirable as it may draw air into the system and encourage the growth of the added organisms or those naturally present.

After the glucose has been removed from the egg, the mixture may be treated to separate the added cells. This separation can be carried out by filtration or centrifugation. In the case of whole egg, this separation is somewhat difficult as it may lead to breakdown of the egg emulsion. Thus in treatment of whole egg it is preferred to leave the yeast cells in the egg liquid. The presence of these cells is not deleterious and does not adversely affect the flavor of the final product.

It is often desirable to pasteurize the fermentation mixture to destroy the added yeast organism and to greatly reduce the numbers of contaminating flora. This can be accomplished by the usual methods of pasteurizing similar liquid food products. For example, the egg material may be passed through a plate pasteurizer or other efficient heat exchanger where its temperature is rapidly brought up to about 140–142° F., held at this temperature level for 2–4 minutes, then cooled. In cases where a sucrose-containing product is desired and where the fermentation is conducted with a yeast of the category B, as above defined, the fermented mass must be pasteurized prior to incorporation of sucrose. Unless this is done, the active yeast cells will digest at least part of the sucrose in the interval prior to drying. If *T. monosa* or other yeast of category A is used pasteurization is not mandatory as the added sucrose will not be assimilated or otherwise attacked.

If it is desired that the final dried product have good whipping properties, then sucrose is incorporated with the egg liquid after the fermentation is completed. The amount of sucrose may range from about 5 to 20%, preferably 10 to 20%. The concentration of sucrose may be increased above 20% as much as desired but is unnecessary and will make the final product too sweet. Although we prefer to add the sucrose after completion of the fermentation, it may be added at any time interval prior to drying. If *T. monosa* or other yeast of category A, as above defined, is used the sucrose may be added prior to the fermentation as these yeasts will not assimilate it. However, there is no particular point in such procedure and in all cases we prefer to add the sucrose after the fermentation is completed. As stated above where a yeast of category B is used, the sucrose is added after both fermentation and pasteurization are completed.

The egg material from which the glucose has been removed in accordance with this invention is then dried to preserve it for future use. For this purpose, spray drying is preferred but other known techniques may be used for such purpose. For example, the material may be dried by subjection to a blast of heated air or may be dried by freezing and subjecting it to a vacuum while frozen. The dried product may be packaged in an atmosphere of air although best results are obtained if it is packaged in sealed containers under vacuum or in an atmosphere of nitrogen or other inert gas. By so doing, deteriorative changes of an oxidative nature are minimized.

PREPARATION OF *TORULOPSIS MONOSA*

The *T. monosa* used in the example was prepared as follows: The organism was cultured on a medium of 2% glucose, 1% yeast extract, and 1% tryptone for 24 hours at 25° C. under aerobic conditions. The cells were separated by centrifugation and washed several times with aqueous 1% sodium chloride solution to remove all occluded medium and metabolic by-products. The cells were then ready for use. If the organism is to be used some time after its preparation then the cells should be made up into a thick suspension in 1% sodium chloride solution. Such a suspension if stored at about 5° C. will retain its activity for at least 3 months.

Having thus described the invention, what is claimed is:

1. In the process of preparing dried eggs wherein an egg liquid is subjected to a fermentation prior to drying to remove the reducing sugars normally present in the egg liquid, the improvement which comprises fermenting the egg liquid with a yeast which is incapable of producing reducing sugars from sucrose by means of invertase elaboration or other cell activities.

2. In the process of preparing dried eggs wherein an egg liquid is subjected to a fermentation prior to drying to remove the reducing sugars normally present in the egg liquid, the improvement which comprises fermenting the egg liquid with the organism *Torulopsis monosa*.

3. The process in accordance with claim 2 wherein the egg liquid is egg white.

4. The process in accordance with claim 2 wherein the egg liquid is egg yolk.

5. The process in accordance with claim 2 wherein the egg liquid is a mixture of egg white and egg yolk.

6. In the process of preparing dried eggs wherein an egg liquid is subjected to a fermentation prior to drying to remove the reducing sugars normally present in the egg liquid, the improvement which comprises fermenting the egg liquid with a yeast which is incapable of producing reducing sugars from sucrose by means of invertase elaboration or other cell activities under resting-cell conditions.

7. In the process of preparing dried eggs wherein an egg liquid is subjected to a fermentation prior to drying to remove the reducing sugars normally present in the egg material, the improvement which comprises fermenting the egg liquid with the organism *Torulopsis monosa* under resting-cell conditions.

8. In the process of preparing dried eggs wherein an egg liquid is subjected to a fermentation prior to drying to remove the reducing sugars normally present in the egg material, the improvement which comprises fermenting the egg liquid with the organism *Torulopsis monosa* under essentially anaerobic conditions for a period of time sufficient to remove the reducing sugar content of the egg material but insufficient to cause any significant growth of the yeast.

9. In the process of preparing dried eggs wherein an egg liquid is subjected to a fermentation to remove the reducing sugars normally present in the egg liquid and the fermented egg liquid is then admixed with sucrose and dried, the improvement which comprises fermenting the egg liquid with a yeast which is incapable of producing reducing sugars from sucrose by means of invertase elaboration or other cell activities thereby to prevent loss of the added sucrose and to prevent conversion thereof into reducing sugars.

10. In the process of preparing dried eggs wherein an egg liquid is subjected to a fermentation to remove the reducing sugars naturally present in the egg material and the fermented egg liquid is then admixed with sucrose and dried, the improvement which comprises fermenting the egg liquid with the organism *Torulopsis monosa* thereby to prevent loss of the added sucrose and to prevent conversion thereof into reducing sugars.

11. The process in accordance with claim 7 wherein the egg liquid is egg white.

12. The process in accordance with claim 7 wherein the egg liquid is egg yolk.

13. The process in accordance with claim 7 wherein the egg liquid is a mixture of egg yolk and egg white.

LEO KLINE.
THOMAS T. SONODA.

REFERENCES CITED

The following references are of record in the file of this patent:

UNITED STATES PATENTS

| Number | Name | Date |
| --- | --- | --- |
| 2,460,986 | Josh et al. | Feb. 8, 1949 |

FOREIGN PATENTS

| Number | Country | Date |
| --- | --- | --- |
| 606,292 | Great Britain | Aug. 11, 1948 |